(12) United States Patent
Rentmeester et al.

(10) Patent No.: US 6,917,857 B2
(45) Date of Patent: Jul. 12, 2005

(54) MAGNETICALLY OVERRIDDEN FLOW CONTROL DEVICE

(75) Inventors: Paul C. Rentmeester, La Crosse, WI (US); Brady J. Moroney, La Crescent, MN (US); Joel C. Vanderzee, La Crosse, WI (US)

(73) Assignee: American Standard International Inc., New York, NY (US)

( * ) Notice: Subject to any disclaimer, the term of this patent is extended or adjusted under 35 U.S.C. 154(b) by 300 days.

(21) Appl. No.: 09/738,089

(22) Filed: Dec. 15, 2000

(65) Prior Publication Data

US 2002/0077727 A1 Jun. 20, 2002

(51) Int. Cl.$^7$ ................................................ G05D 7/00
(52) U.S. Cl. ................................ 700/282; 137/624.12
(58) Field of Search ......................... 700/282; 62/222; 251/129.04; 137/624.11, 624.12

(56) References Cited

U.S. PATENT DOCUMENTS

| | | | |
|---|---|---|---|
| 3,205,323 A | * 9/1965 | Deshautreaux, Jr. | ........ 335/207 |
| 3,495,620 A | 2/1970 | Raimondi et al. | |
| 4,217,647 A | * 8/1980 | Sjoholm et al. | ............ 700/282 |
| 4,328,684 A | 5/1982 | Leo | |
| 4,499,920 A | * 2/1985 | Steffan et al. | ......... 137/624.15 |
| 4,928,494 A | 5/1990 | Glamm | |
| 5,236,011 A | 8/1993 | Casada et al. | |
| 5,316,263 A | 5/1994 | Mino | |
| 5,331,619 A | * 7/1994 | Barnum et al. | ................ 700/3 |
| 5,417,083 A | 5/1995 | Eber | |
| 6,044,857 A | * 4/2000 | Stege | ............................ 137/1 |
| 6,332,327 B1 | * 12/2001 | Street et al. | ................... 62/127 |

* cited by examiner

*Primary Examiner*—Leo Picard
*Assistant Examiner*—Alexander Kosowski
(74) *Attorney, Agent, or Firm*—William J. Beres; William O'Driscoll

(57) ABSTRACT

A flow control device. The flow control device comprises a valve; an actuator operably connected to and positioning the valve and a controller operably connected to the actuator and providing control signals thereto. An external signal provides control input to the controller. A magnetically actuated sensor is operatively connected to the controller and provides a signal thereto in response to the movement of a magnetic field.

15 Claims, 3 Drawing Sheets

MAGNETICALLY OVERRIDDEN FLOW CONTROL DEVICE

BACKGROUND OF THE INVENTION

The present invention is directed to override modes for flow control devices. More specifically, the present invention is directed to the use of a magnetically actuated sensor in the electronic expansion valve of an HVAC or refrigeration system and the initiation of an additional or override mode of operation responsive to the sensed magnetic field.

To position an electronic flow control device prior to installation of its main processor and its connective cabling is difficult since the main processor is used to implement the position of such a flow control device. Examples when it would be advantageous to implement pre-installation positioning occur during manufacturing tests of the device itself, during factory tests on the assembly line of the HVAC system, and at a job site after an HVAC system or refrigeration system has been installed but before the electronic controls are in place.

Additionally, a service technician initiating diagnostics or fault testing on an HVAC system having an electronic flow control device such as an electronic expansion valve may wish to initiate an override in the flow control device which either avoids the HVAC system controller or allows the technician to initiate the override remotely from the controller's operator interface.

There are various situations in the field where the owner of a system having a flow control device such as an electronic expansion valve may wish to manually control or override the operation of a flow control device.

SUMMARY OF THE INVENTION

It is an object, feature and advantage of the present invention to address the problems of the prior art.

It is an object, feature and advantage of the present invention to provide an apparatus and method for testing flow control devices prior to control circuitry being fully attached to such devices.

It is an object, feature and advantage of the present invention to allow a service technician to initiate an override or test functions in a flow control device using a manual device. It is a further object that this manual device be a simple magnet.

It is an object, feature and advantage of the present invention to allow a service technician to initiate an override in a flow control device remotely of a system controller.

It is an object, feature and advantage of the present invention to allow an owner of a flow control device to initiate a manual or override operation of a flow control device. It is a further object, feature and advantage of the present invention that the manual or override operation be cancelled if the existence of a system controller is identified, thereby avoiding control conflicts.

It is an object, feature and advantage of the present invention to allow an electronic expansion valve to be positioned prior to installation of cabling and a main processor. It is a further object, feature and advantage of the present invention that the pre-installation positioning be accomplished without custom software or an additional personal computer. It is a further object, feature and advantage of the present invention to eliminate additional hardware and software to focus trouble shooting when a problem arises.

The present invention provides a flow control device. The flow control device comprises a valve; an actuator operably connected to and positioning the valve and a controller operably connected to the actuator and providing control signals thereto. The controller operates in response to an external signal or in response to the main processor. A magnetically actuated sensor is operatively connected to the controller and providing a signal in response to the movement or presence of a magnetic field.

The present invention also provides a flow control device. The flow control device comprises a valve; controller circuitry, and a magnetically actuated sensor. The controller circuitry is operatively connected to the valve and controls a position of the valve in response to a first condition. The magnetically actuated sensor is operatively connected to the control circuitry to detect a magnetic field and initiate a control mode sequence in the control circuitry.

The present invention additionally provides a method of controlling an electronic expansion valve. The method comprises the steps of: providing an electronic expansion valve having a normal mode of operation and an override mode of operation; controlling the operation of the electronic expansion valve in its normal mode responsive to a first condition; and controlling the operation of the electronic expansion valve in its override mode responsive to a magnetically actuated sensor.

The present invention further provides a method of controlling a flow control device. The method comprises the steps of: providing a flow control device having a housing; inducing a magnetic field in the housing; sensing the presence or absence of the magnetic field; and initiating a control mode sequence of the flow control device responsive to the sensed magnetic field.

The present invention yet further provides a flow control device. The device comprises a housing; an actuator located within the housing; a controller operably connected to and controlling the actuator in response to a first condition; and a magnetically actuated sensor. The magnetically actuated sensor is operably connected to the controller and provides a signal to the controller in response to sensing the presence or absence of a magnetic field. The controller initiates a predetermined control sequence in response to the sensed presence of a magnetic field.

The present invention further provides a method of configurating a device having a control portion and a functional portion. The method comprises the steps of: sending a magnetic signal to the device; receiving the magnetic signal in the device; recognizing the magnetic signal in the control portion of the device; transmitting from the control portion of the device a signal requesting an identity and operating parameters to a remote main processor; and receiving and implementing the identity and operating parameters from the remote main processor.

The present invention also provides a device. The device comprises a control portion; a functional portion operably connected to the control portion and responsive thereto; and a magnetic sensor operably connected to the control portion and operably configured to receive a magnetic signal.

The present invention additionally provides a device. The device comprises a control portion; a functional portion operably connected to the control portion and responsive thereto; and a non-invasive sensor operably connected to the control portion and operably configured to receive a magnetic signal.

The present invention also provides a device that provides an analog or digital input or output. The device comprises:

a control portion and a functional portion operably connected and controlled by the control portion. The functional portion is operably capable of providing an analog or digital input or output. The control portion includes an external communications port operably connected to a control bus, an actuator responsive to a magnetic signal, and a controller operably connected to the external communications port and capable of sending and receiving communications through that port. The controller is operably connected to the actuator and receives a signal from the actuator, and the controller enables itself to receive a signal from the external port after receiving a signal from the actuator. The controller places itself in the enabling configuration mode anytime it receives an actuator signal.

DETAILED DESCRIPTION OF THE DRAWINGS

Figure 1:
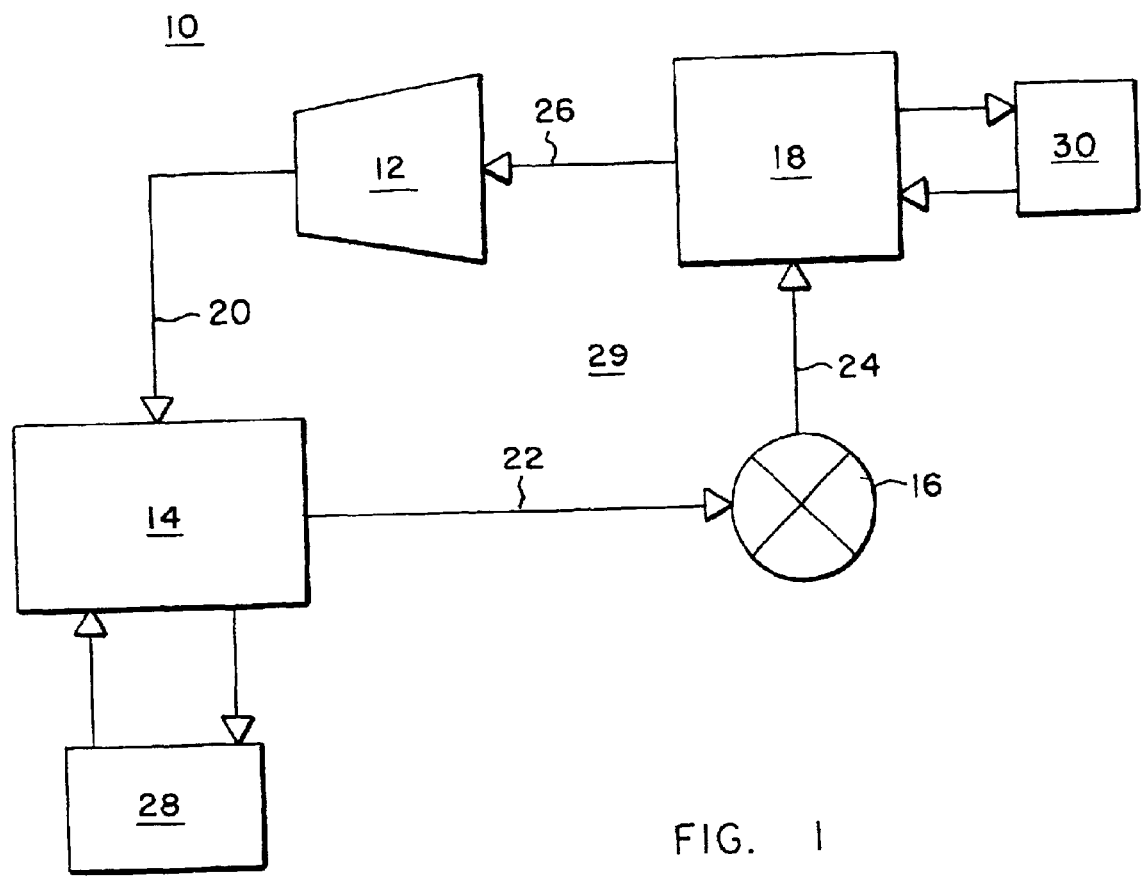
FIG. 1 is a block diagram of an HVAC or refrigeration system showing the major components and the flow of refrigerant through the system, including an electronic flow control device.
Figure 2:
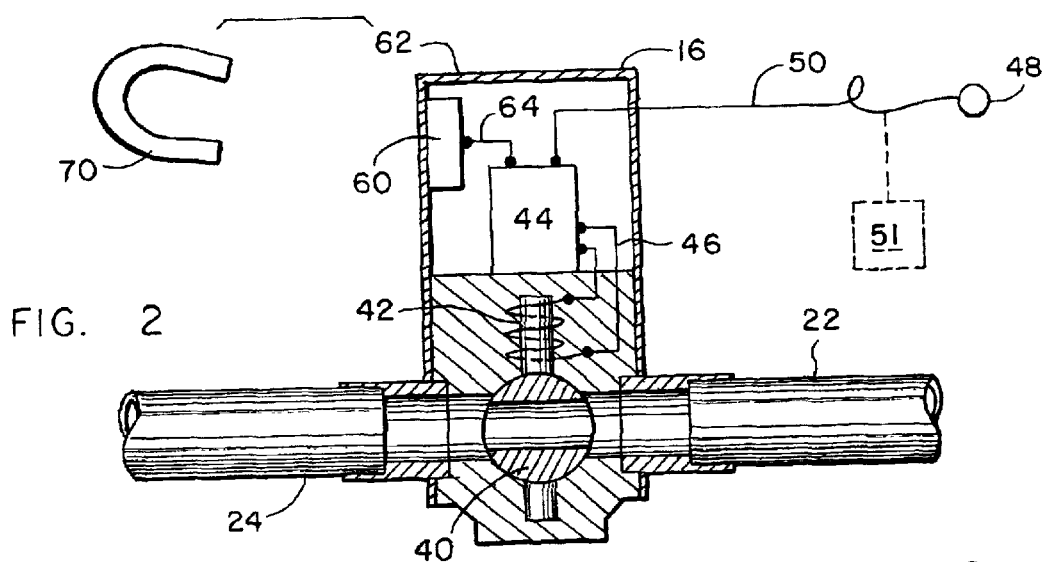
FIG. 2 is a block diagram of the present invention used in accordance with the flow control device of FIG. 1.

Reference will now be made in detail to the preferred embodiment of the invention, an example of which is illustrated in FIGS. 1 and 2 of the accompanying drawings. The same reference numerals will be used throughout the drawings to refer to the same or like parts including the alternative embodiments of FIGS. 3 and 4.

While the invention is described in connection with these embodiments, it is understood that the invention is not limited to these embodiments or to an HVAC or refrigeration system. On the contrary, the invention is directed to electronic flow control devices in general and includes all alternatives, modifications, and equivalents within the spirit and scope of the appended claims.

FIG. 1 shows a block diagram of a heating, ventilating or air conditioning (HVAC) system or refrigeration system 10 which includes a compressor 12, a condenser 14, an electronic flow control device 16 such as an expansion valve, and an evaporator 18. These components are connected by refrigeration conduits 20, 22, 24 and 26 to form a refrigeration circuit 29. In this circuit 29, refrigerant gas enters the compressor 12 from the conduit 26 and is compressed in the compressor 12, thus raising its temperature and increasing its pressure. The compressed gas from the compressor 12 enters the condenser 14 via the conduit 20. In the condenser 14, the hot compressed gas is condensed into liquid form and contacted with a heat sink 28 such as ambient air, ground water, chilled water from a cooling tower, or another cooling medium, to remove heat from the condensing refrigerant. The condensed refrigerant passes from the condenser 14 through the conduit 15 and through an electronic flow control device 16 such as an electronic expansion valve. The electronic flow control device 16 modulates to allow a limited quantity of liquid refrigerant to enter the evaporator through the conduit 24, while maintaining the pressure difference between the higher pressure condenser 14 and the lower pressure evaporator 18. The liquid refrigerant entering the evaporator 18 evaporates after contacting a heat load 30, preferably a fluid such as water or air that is to be cooled, thus absorbing heat from the heat load 30. The refrigerant vapor leaves the evaporator 18 via the conduit 26 and returns to the compressor 12 to repeat the cycle.

Figure 3:
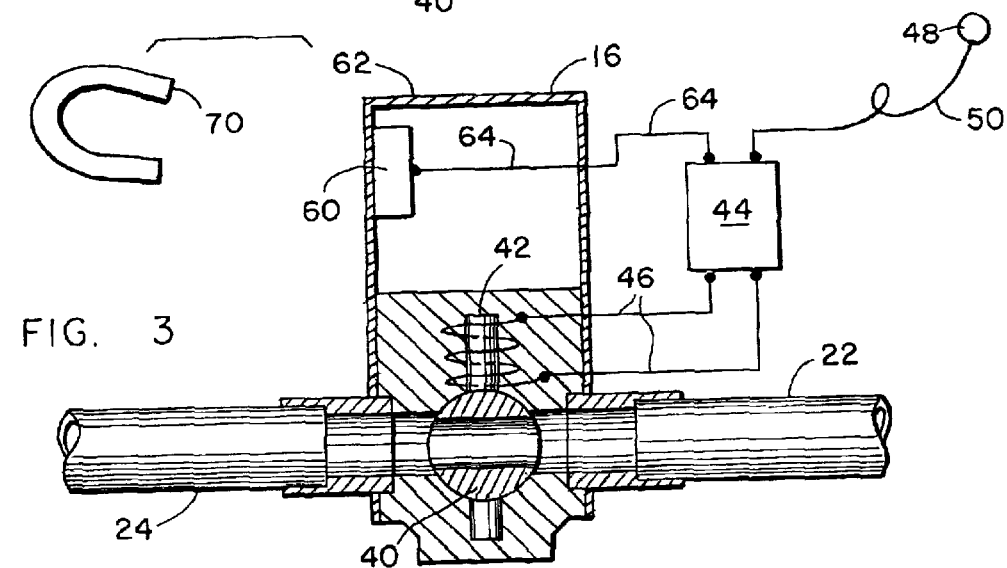
FIG. 3 is a block diagram of an alternative embodiment of the present invention used in accordance with the flow control device of FIG. 1.
Figure 4:
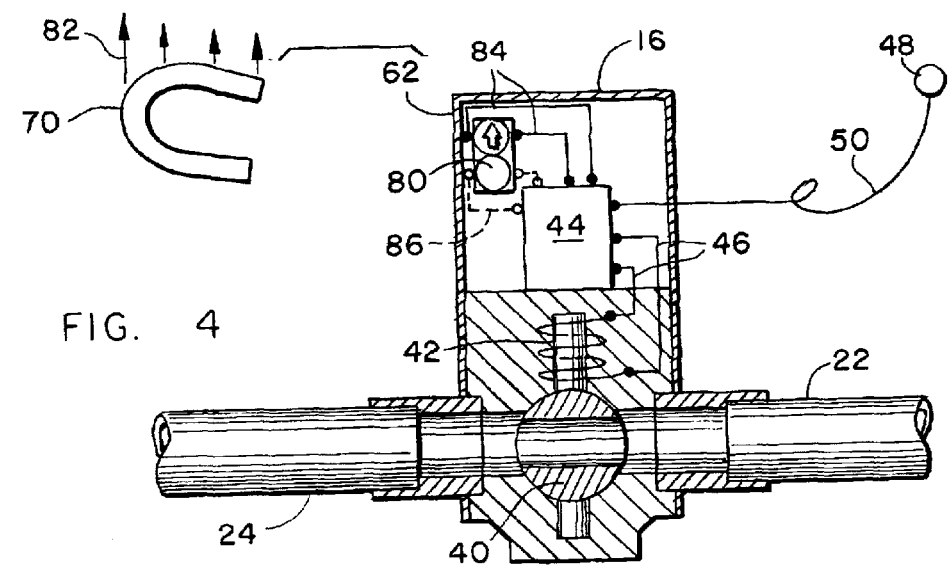
FIG. 4 is a block diagram of a further alternative embodiment of the present invention used in accordance with the flow control device of FIG. 1.

Exemplary systems are sold by The Trane Company, a Division of American Standard Inc., having a place of business in La Crosse, Wis., under the trademarks Series R and 3D. As shown in FIGS. 2–4, the present invention is directed to the flow control device 16 and to methods of controlling or actuating that device 16 under special circumstances. Various electronic flow control devices including electronic expansion valves (EXV) are known in the art as exemplified by applicant's U.S. Pat. No. 4,928,494 to Glamm and U.S. Pat No. 5,417,083 to Eber, both of which are commonly assigned to the owner of the present invention and hereby incorporated by reference.

The preferred embodiment of the present invention is shown with reference to FIG. 2. In FIG. 2, the electronic flow control device is implemented as an electronic expansion valve having a valve portion 40 operable to control the flow of refrigerant from the conduit 22 through the flow control device 16 and into the conduit 24. The valve portion 40 is operatively connected to an actuator portion 42 which conventionally positions the valve portion 40 so as to control and modulate the refrigerant flow. The actuator portion 42 is operatively connected to and controlled by a controller 44 by means of a control line 46. The controller 44 issues control signals to the actuator portion 42 responsive to a signal received from a temperature or pressure sensor 48, or an additional system controller such as a main processor 51, by means of an electrical connection line 50.

The present invention adds a magnetically actuated sensor 60 which provides a signal in response to sensing a magnetic field.

The magnetically actuated sensor 60 is preferably implemented as a hall effect sensor. This allows an assembler in the factory, a field technician, or an owner to use a readily available magnet 70 external of the flow control device 16 to initiate a test function, an override, or a predetermined control sequence. The test function might consist of initiating a sequence to move the valve portion 40 to required positions, thereby allowing a functional test upon final assembly such as placing the valve portion 40 in a fully closed and/or a mid-position setting. The mid-position setting allows the valve portion 40 to be brazed while at that mid-position and then driven closed and/or driven open for a subsequent pressure test.

FIG. 3 is an alternative embodiment of the present invention where the controller 44 is external of the housing 62 of the flow control device 16. The magnetically actuated sensor 60 is still located within the housing 62 and provides its signal to the remote controller 44 in a manner similar to the preferred embodiment.

FIG. 4 is a further alternative embodiment where the hall effect sensor is replaced by an object 80 which can be moved by a magnetic force. For example, the external magnet 70 is moved in a direction 82 such that the object 80 is lifted by the magnetic force in that same direction 82. The object 80 either closes an electrical connection as indicated by electrical lines 84 or opens an electrical connection as indicated by lines 86. It is also contemplated that fiberoptic cabling could be used instead of electrical lines and the object 80 could be used to physically block or open an optical path in an optical line.

Figure 5:
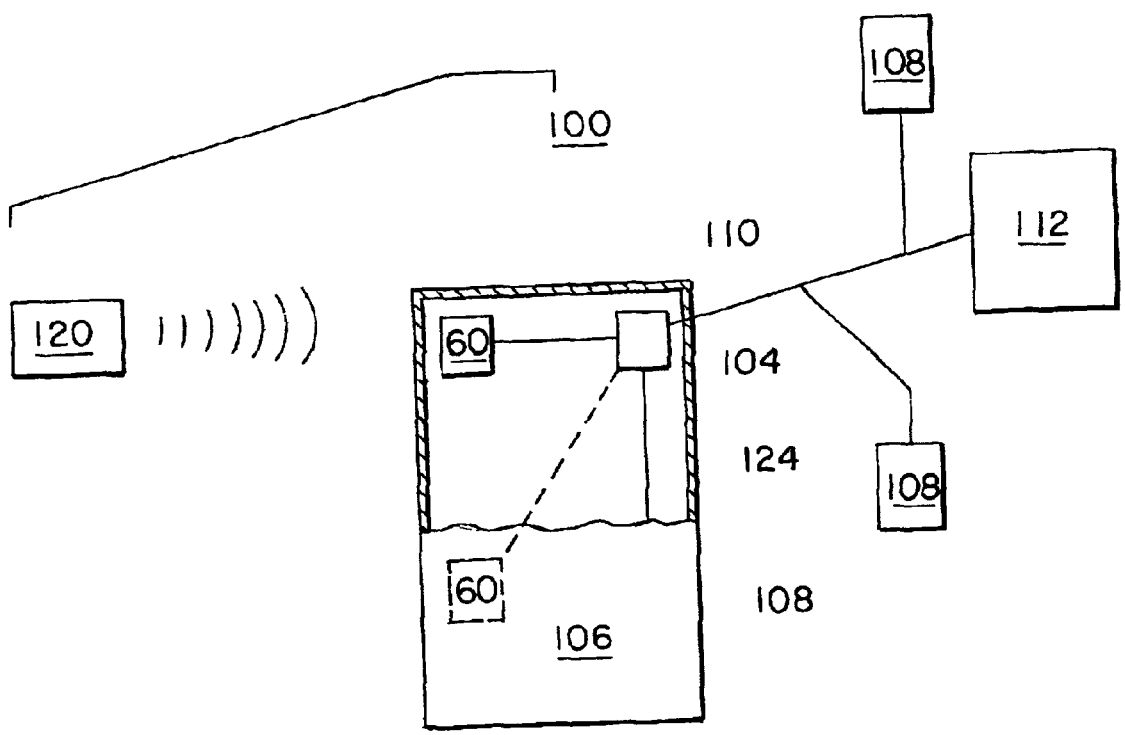
FIG. 5 is a block diagram of the present invention in a generalized form.

FIG. 5 is a block diagram 100 of the invention in a more generalized form. Previously the invention has been described in terms of a preferred embodiment utilizing an expansion valve, but the present invention also applies to a variety of other devices which have a control portion 102 including a microprocessor 104, and a functional portion 106. The combination of the control portion 102 and the functional portion 106 make up a unitary device 108. The functional portion 106 may be a sensor such as a temperature sensor, a pressure sensor or a level sensor or the functional portion 106 may be a control device such as a valve or an actuator such as the solenoid. For purposes of this application, such a unitary device is referred to as a low level intelligent device or LLID. The low level intelligent devices are installed throughout an industrial product such as the HVAC or refrigeration system 10 of FIG. 1, and are interconnected by a communications bus 110 (or electrical connection 50) that provides each low level intelligent device 108 with the necessary power and with communications to a main processor 112 for each system 10.

Each low level intelligent device 108 must be provided with an identity which the low level intelligent device will thereafter use to identify itself when communicating on the bus 110 and when recognizing communications on the bus 110 directed to that particular low level intelligent device 108. Additionally, the control portion 102 of each low level intelligent device must be provided with the appropriate operating parameters. This is accomplished by adding the magnetically actuated sensor 60, preferably in the control portion 102, but potentially in the functional portion 60 as indicated by the dashed lines. A magnetic actuator 120 is then used to enable the control portion 102 of the particular low level intelligent device so that that control portion 102 will recognize and accept an identity and operating parameters.

In a preferred embodiment, the use of the magnetic actuator 120 basically resets the control portion 102 to an identity of zero so that the main processor 112 can initially determine that only one control portion 102 is presently under and using the zero identity, and then send a command to the zero identity address configuring the controller using the zero identity to change its identity to a particular identity and to operate using particular operating parameters. In this preferred embodiment, any time the control portion 102 is exposed to and receives a signal from the magnetically actuated sensor 60, the control portion 102 will place itself in the configuration enabling mode such that the control portion 102 can be reconfigured by the main processor 112.

In a further preferred embodiment of the present invention, the magnetic actuator 120 is used to cause the magnetic sensor 60 to send a change of state signal to the microprocessor 104 by means of any conventional connection 122. The control portion 102 then sends a signal on the bus 110 (as long as an identity and operating parameters have not already been downloaded from the main processor 112) to the main processor 112 requesting such identity in operating parameters. The main processor 112 then sends a return signal providing the requisite identity and operating parameters.

The functional portion 106 may be any digital or analog input or output conventionally used to control a product and includes an operable connection 124 to the microprocessor 104 allowing the control portion 102 to receive the digital or analog input or output from the functional portion 106 and control that functional portion 106.

In all of these embodiments a simple make break connection provides a signal to the controller 44 in response to the movement or presence of a magnetic field external to the housing 62. This allows the initiation of modes of operation in addition to the modes of operation initiated by the sensor 48 or a remote system controller 51.

While the present invention has been disclosed in terms of an electronic flow control device such as an electronic expansion valve, it will be readily apparent to a person of ordinary skill in the art that the invention can be applied to any electronically controlled device to initiate additional or override modes of operation in that control device. All such modifications and alterations are considered to fall within the spirit and scope of the claimed invention.

What is desired to be secured for Letters Patent of the United States is set forth in the following claims.

What is claimed is:

1. A flow control device comprising:
   a housing;
   a valve within the housing;
   an actuator portion within the housing and operably connected to and positioning the valve;
   a controller operably connected to the actuator and providing control signals thereto;
   an external communications system operably connected to the controller and providing control signal input thereto;
   a magnetically actuated sensor operatively connected to the controller and providing a first signal thereto in response to the movement or presence of a magnetic field; and
   a magnetic actuator external of the housing for generating the magnetic field.

2. The flow control device of claim 1 wherein the controller positions the actuator in response to receiving the first signal from the sensor.

3. The flow control device of claim 1 wherein the controller transmits a second signal on the communications system in response to receiving the first signal.

4. The flow control device of claim 3 wherein the controller does not transmit the second signal if the controller determines that the controller has an identity.

5. The flow control device of claim 4 wherein the magnetically actuated sensor is a Hall effect sensor.

6. A flow control device comprising:
   a housing;
   a valve within the housing;
   controller circuitry operatively connected to the valve and controlling a position of the valve in response to a first condition;
   a magnetically actuated sensor operatively connected to the control circuitry for detecting a magnetic field and initiating a control mode sequence in the control circuitry; and
   a magnetic actuator external of the housing for generating the magnetic field.

7. The flow control device of claim 6 wherein the controller positions the valve in response to the control mode sequence being initiated.

8. The flow control device of claim 6 further including communications circuitry in the control circuitry wherein the communications circuitry is operatively connected to a communications bus for two-way communications.

9. The flow control device of claim 8 wherein the control circuitry sends a first signal to the communications circuitry in response to the initiation of the control mode sequence.

10. The flow control device of claim 9 wherein the control circuitry does not transmit the first signal if the control circuitry determines that it has an identity.

11. The device of claim 10 wherein the first condition is temperature, pressure or a command from a remote controller.

12. A flow control device comprising:
- a housing;
- an actuator located within the housing;
- a controller operably connected to and controlling the actuator in response to a first condition;
- a magnetically actuated sensor operably connected to the controller and providing a signal to the controller in response to sensing the presence or absence of a magnetic field wherein the controller initiates a predetermined control sequence in response to the sensed presence of a magnetic field; and
- a magnetic actuator external of the housing for generating the magnetic field.

13. The flow control device of claim 12 wherein the magnetically actuated sensor is a hall effect sensor.

14. The flow control device of claim 13 wherein the magnetically actuated sensor includes a magnetically moveable object.

15. The flow control device of claim 14 wherein the controller includes circuitry operatively connected to and communicating with a communications bus and wherein the predetermined control sequence includes the transmission of a signal on the communications bus using the control circuitry.

* * * * *